Patented Mar. 30, 1954

2,673,879

UNITED STATES PATENT OFFICE 2,673,879

SUBSTITUTED HALOALKYLAMINES

Jack Mills and Ewald Rohrmann, Indianapolis, Ind., assignors to Eli Lilly and Company, Indianapolis, Ind., a corporation of Indiana No Drawing. Application July 30, 1949, Serial No. 107,818

5 Claims. (Cl. 260—570)

This invention relates to novel organic compounds, and more particularly to benzylphenoxyethyl derivatives of substituted haloalkylamines, their salts, and to the method for their preparation.

The compounds of the present invention in the form of their bases, are represented by the following formula

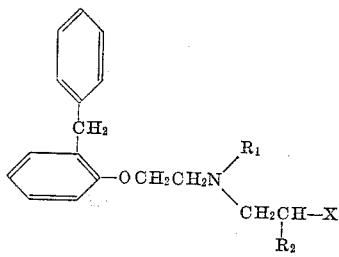

and in the form of their salts are represented by the following formula

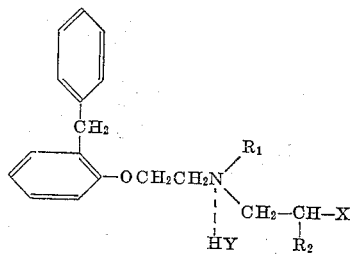

In the above formulas, $R_1$ is a radical of the class consisting of benzyl and alkyl radicals having from 1 to 4 carbon atoms, $R_2$ is hydrogen or methyl, X is a middle halogen, i. e. chlorine or bromine, and HY represents one equivalent of the salt-forming acid.

Thus, for example, referring to the first formula, when $R_1$ is methyl, $R_2$ is hydrogen and X is chlorine, the compound is N-o-benzylphenoxyethyl-N-methyl-$\beta$-chloroethylamine; when $R_1$ is n-butyl, $R_2$ is hydrogen and X is chlorine, the compound is N-o-benzylphenoxyethyl-N-n-butyl-$\beta$-chloroethylamine; when $R_1$ is benzyl, $R_2$ is hydrogen and X is chlorine, the compound is N-o-benzylphenoxyethyl - N - benzyl - $\beta$ - chloroethylamine; when $R_1$ is ethyl, $R_2$ is methyl and X is bromine, the compound is N-o-benzylphenoxy-N-ethyl-$\beta$-bromopropylamine; and when $R_1$ is isopropyl, $R_2$ is hydrogen and X is bromine, the compound is N-o-benzylphenoxyethyl-N-isopropyl-$\beta$-bromoethylamine.

The novel bases generally are oily liquids which are soluble in organic solvents and largely insoluble in water. The acid addition salts of the bases generally are water soluble. The bases and their salts have the property of reversing the action of epinephrine in animal organisms, and in addition have valuable antihistaminic properties characterized by long duration of action.

Broadly speaking, the compounds are prepared in their salt form by reacting an ethylene dihalide with an alkali-metal salt of o-benzylphenol to yield the corresponding o-benzylphenyl $\beta$-haloethyl ether. The haloethyl ether is treated with an alkylamino alkanol, whereupon an N-o-benzylphenoxyethyl-N-alkyl-$\beta$-hydroxyalkylamine results. The hydroxyalkylaminoalkyl substituted ethyl ether of o-benzylphenol thus formed is treated with a thionyl halide, to yield the desired N-o-benzylphenoxyethyl-N-alkyl-$\beta$-haloalkylamine in the form of its hydrogen halide salt. The base is obtained by treating the salt with an alkali. Salts of the novel compounds are also prepared by reacting stoichiometric amounts of the base and the desired acid.

The following examples more specifically illustrate the preparation of the novel compounds.

Example 1

Preparation of N-o-benzylphenoxyethyl-N-isopropyl-$\beta$-chloroethylamine hydrochloride.

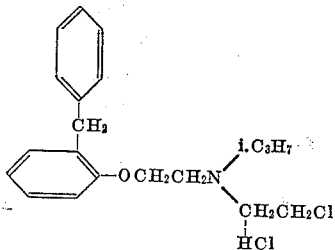

*a.* Preparation of o-benzylphenyl $\beta$-chloroethyl ether.

To a solution of 11.9 g. (.516 mol) of sodium ethoxide in 500 cc. of absolute ethanol are added 100 g. (.516 mol) of o-benzylphenol. The solution is stirred, 300 g. of ethylene chlorobromide are added, and the mixture is refluxed for about 16 hours. The reaction mixture is then cooled, the precipitated sodium bromide removed and the ethanol is distilled off in vacuo. The residue, comprising o-benzylphenyl $\beta$-chloroethyl ether, is dissolved in 1 l. of ether and the ether solution is washed three times with 200 cc. of 10 percent aqueous sodium hydroxide solution, followed by washing with a 200 cc. portion of water. The washed ether solution is dried over anhydrous magnesium sulfate, and the ether is evaporated off. The residue is fractionally distilled under reduced pressure whereupon pure o-benzylphenyl β-chloroethyl ether, boiling at 120° C. at .05 mm., is obtained. On crystallization from ethanol, o-benzylphenyl β-chloroethyl ether thus prepared melts at about 69° C.

b. Condensation of o-benzylphenyl β-chloroethyl ether with isopropylaminoethanol.

A mixture of 46.4 g. (.2 mol) of o-benzylphenyl β-chloroethyl ether and 103 g. (1 mol) of isopropylaminoethanol is heated at 140° C. for 6 hours. The excess isopropylaminoethanol is removed by evaporation in vacuo, and the residue is taken up in dilute hydrochloric acid. The acid solution is washed with ether to remove unchanged o-benzylphenyl β-chloroethyl ether. The aqueous solution is made strongly basic with 10 percent sodium hydroxide solution, and extracted three times with ether. The ether extracts are combined, dried over anhydrous magnesium sulfate, and the ether is evaporated in vacuo. The residue, comprising N-o-benzylphenoxyethyl-N-isopropyl β-hydroxyethylamine, is fractionally distilled under reduced pressure. N-o-benzylphenoxyethyl - N - isopropyl β - hydroxyethylamine thus prepared boils at about 160° C. at .1 mm. pressure.

c. Preparation of N-o-benzylphenoxyethyl-N-isopropyl-β-chloroethylamine hydrochloride.

To a solution of 30.9 g. (0.1 mol) of N-o-benzylphenoxyethyl- N-isopropyl-β-hydroxyethylamine obtained as set out above in 400 cc. of chloroform are added 13.0 g. (.11 mol) of thionyl chloride, over a period of 10 minutes. The reaction mixture is refluxd for 2 hours, and on cooling, the excess thionyl chloride is decomposed by adding ethanol to the reaction mixture. The reaction mixture is evaporated in vacuo, and the residue is dissolved in ethanol and the ethanol again removed in vacuo in order to remove traces of thionyl chloride. The residue, comprising N-o-benzylphenoxyethyl - N-isopropyl-β-chloroethylamine hydrochloride, is purified by crystallization from ethanol-ether mixture.

N-o-benzylphenoxyethyl-N-isopropyl-β-chloroethylamine hydrochloride thus prepared melted at about 138° C. Analysis showed the presence of 3.81 percent of nitrogen as compared with the calculated amount of 3.80 percent.

*Example 2*

Preparation of N - o - benzylphenoxyethyl-N-benzyl-β-chloroethylamine hydrochloride.

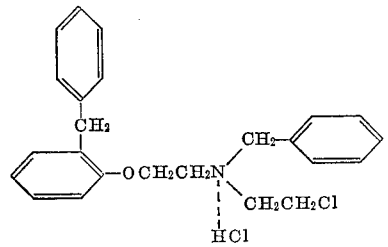

The procedure of Example 1 is followed, except that the o-benzylphenyl β-chloroethyl ether is treated with 151 g. (1 mol) of N-benzylethanolamine. The N-o-benzylphenoxyethyl-N-benzyl-β-hydroxyethylamine thus formed is treated with thionyl chloride according to the procedure of Example 1.

N-o-benzylphenoxyethyl - N - benzyl-β-chloroethylamine hydrochloride thus prepared melted at about 152° C.

*Example 3*

Preparation of N - o - benzylphenoxyethyl-N-methyl-β-chloroethylamine hydrochloride.

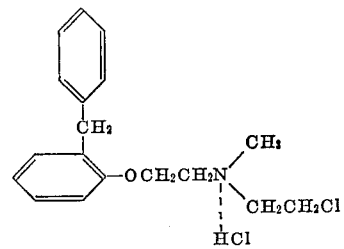

The procedure of Example 1 is followed, except that the o-benzylphenyl β-chloroethyl ether is treated with 74 g. (1 mol) of N-methylethanolamine. The N-o-benzylphenoxyethyl-N-methyl-β-hydroxyethylamine which results is treated with thionyl chloride according to the procedure of Example 1(c).

N-o-benzylphenoxyethyl - N-methyl-β-chloroethylamine hydrochloride thus prepared melted at about 110° C. Analysis showed the presence of 4.08 percent of nitrogen compared with the calculated amount of 4.12 percent.

*Example 4*

Preparation of N-o-benzylphenoxyethyl-N-isopropyl-β-bromoethylamine hydrobromide.

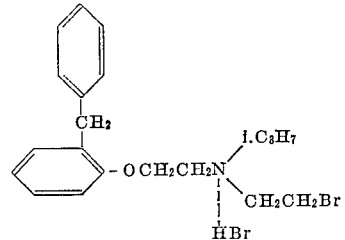

The procedure of Example 1 is followed, except that in step (c) the N-o-benzylphenoxyethyl-N-isopropyl-β-hydroxyethylamine is treated with 22.85 g. (.11 mol) of thionyl bromide.

N - o - benzylphenoxyethyl - N - isopropyl-N-β-bromoethylamine hydrobromide thus prepared melted at about 135° C.

*Example 5*

Preparation of N - o - benzylphenoxyethyl-N-ethyl-β-chloropropylamine hydrochloride.

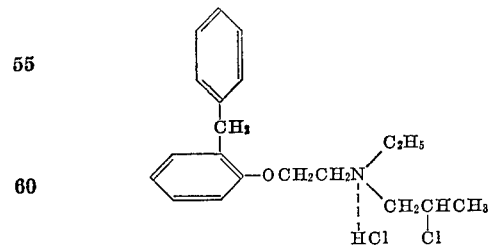

The procedure of Example 1 is followed, except that the o-benzylphenyl β-chloroethyl ether is treated with 102 g. (1 mol) of N-ethyl-β-hydroxypropylamine. The N-o-benzylphenoxyethyl-N-ethyl-β-hydroxypropylamine thus prepared is treated with thionyl chloride as set out in Example 1(c).

N-o-benzylphenoxyethyl - N - ethyl - β - chloropropylamine hydrochloride thus prepared melted at about 109° C. Analysis showed the presence of 3.94 percent of nitrogen as compared with the calculated amount of 3.80 percent.

Example 6

Preparation of N-o-benzylphenoxy-N-n-butyl-β-chloroethylamine hydrochloride.

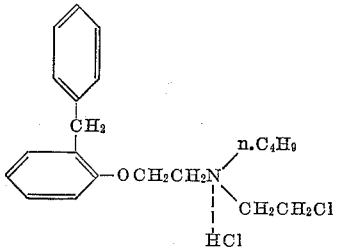

The procedure of Example 1 is followed, except that the o-benzylphenyl β-chloroethyl ether is treated with 116 g. (1 mol) of N-n-butylethanolamine. The N-o-benzylphenoxyethyl-N-n-butyl-β-hydroxyethylamine thus prepared is treated with thionyl chloride as set out in Example 1(c).

N-o-benzylphenoxyethyl-N-n-butyl-β-chloroethylamine hydrochloride thus prepared melted at about 112° C.

Example 7

Preparation of N-o-benzylphenoxyethyl-N-ethyl-β-chloroethylamine base and acid addition salts thereof.

A cold aqueous solution of N-o-benzylphenoxyethyl-N-ethyl-β-chloroethylamine hydrochloride is neutralized with 10 percent aqueous sodium carbonate. The reaction mixture is kept cold and extracted three times with equal volumes of ether, and the aqueous solution is discarded. The ether extracts are combined, washed with a small amount of water, and dried over anhydrous magnesium sulfate. The ether is then evaporated off in vacuo, leaving as a residue N-o-benzylphenoxyethyl-N-ethyl-β-chloroethylamine base, in the form of an oil.

The base is converted into its sulfuric acid addition salt according to the following procedure:

A solution of 33.1 g. (0.1 mol) of N-o-benzylphenoxyethyl-N-ethyl-β-chloroethylamine in 150 cc. of ethanol is treated with 4.9 g. (0.05 mol) of $H_2SO_4$ dissolved in 100 cc. of ethanol. The mixture is evaporated to dryness, whereupon N-o-benzylphenoxyethyl-N-ethyl-β-chloroethylamine sulfate is recovered.

The same procedure may be followed using instead of sulfuric acid, hydrochloric acid, hydrobromic acid, phosphoric acid, nitric acid, or acetic acid, to obtain, respectively, the hydrochloride, hydrobromide, phosphate, nitrate and acetate salts. Likewise, other acids may be employed in the procedure to provide desired acid addition salts.

Example 8

Any of the acid addition salts disclosed and prepared in Examples 1 to 7 inclusive can be converted to their free base by treating a cold aqueous solution of the acid salt with an aqueous alkali, extracting the organic base with ether, and evaporating the ether solution of the organic base.

We claim:

1. A compound of the class consisting of free bases and their acid addition salts, said bases being represented by the formula

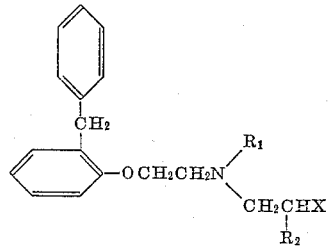

wherein $R_1$ is a member of the group consisting of benzyl and alkyl radicals having from 1 to 4 carbon atoms, $R_2$ is a member of the group consisting of hydrogen and methyl, and X is a member of the group consisting of chlorine and bromine.

2. N-o-benzylphenoxyethyl-N-ethyl-β chloroethylamine hydrochloride.

3. N-o-benzylphenoxyethyl-N-isopropyl-β-chloroethylamine hydrochloride.

4. N-o-benzylphenoxyethyl-N-benzyl-β-chloroethylamine hydrochloride.

5. N-o-benzylphenoxyethyl-N-ethyl-β-chloroethylamine.

JACK MILLS.
EWALD ROHRMANN.

References Cited in the file of this patent

Haley, "The Antihistamine Drugs," J. Amer. Pharmaceutical Assn., Scientific Edition, vol. 37, page 387.